United States Patent
Yu et al.

(10) Patent No.: US 11,403,368 B2
(45) Date of Patent: Aug. 2, 2022

(54) DIAGNOSTIC MODEL GENERATING METHOD AND DIAGNOSTIC MODEL GENERATING APPARATUS THEREFOR

(71) Applicant: SAMSUNG ELECTRONICS CO., LTD., Suwon-si (KR)

(72) Inventors: Seung-hak Yu, Yongin-si (KR); Min-seo Kim, Seoul (KR); Deok-ho Kim, Seoul (KR); Ji-hwan Yun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 159 days.

(21) Appl. No.: 16/089,775

(22) PCT Filed: Mar. 14, 2017

(86) PCT No.: PCT/KR2017/002704
§ 371 (c)(1),
(2) Date: Sep. 28, 2018

(87) PCT Pub. No.: WO2017/171266
PCT Pub. Date: Oct. 5, 2017

(65) Prior Publication Data
US 2019/0108086 A1 Apr. 11, 2019

(30) Foreign Application Priority Data
Apr. 1, 2016 (KR) .................. 10-2016-0040291

(51) Int. Cl.
*G06F 11/00* (2006.01)
*G06F 17/18* (2006.01)
(Continued)

(52) U.S. Cl.
CPC .......... *G06F 17/18* (2013.01); *G06F 11/0703* (2013.01); *G06F 11/0748* (2013.01);
(Continued)

(58) Field of Classification Search
CPC .... G06F 11/0766; G06F 16/33; G06F 16/313; G06F 16/90332; G06F 16/3329; G06F 16/3344
See application file for complete search history.

(56) References Cited

U.S. PATENT DOCUMENTS 6,594,657 B1    7/2003   Livowsky
7,120,559 B1   10/2006   Williams et al.
(Continued)

FOREIGN PATENT DOCUMENTS

CN       1823334      8/2006
JP     2001-325104   11/2001
(Continued)

OTHER PUBLICATIONS

International Search Report for PCT/KR2017/002704, dated Jun. 19, 2017, 4 pages.
(Continued)

*Primary Examiner* — Katherine Lin
(74) *Attorney, Agent, or Firm* — Nixon & Vanderhye, P.C.

(57) ABSTRACT

Provided are a diagnostic model generating apparatus and a diagnostic model generating method therefor. The diagnostic model generating method may comprising: extracting at least one keyword from consultation data between a user and a consultant for resolving electronic device errors; on the basis of the at least one extracted keyword, determining a diagnostic sequence between the plurality of diagnostic commands for resolving errors and a plurality of diagnostic commands; and storing a diagnostic model comprising the plurality of determined diagnostic commands and determined diagnostic sequence.

13 Claims, 12 Drawing Sheets

(51) Int. Cl.
  *G06N 20/00* (2019.01)
  *G06F 11/07* (2006.01)
  *G06F 16/33* (2019.01)
  *G06F 16/9032* (2019.01)
  *G06F 16/332* (2019.01)
  *G06F 40/279* (2020.01)
  *G06F 16/31* (2019.01)

(52) U.S. Cl.
  CPC ...... *G06F 11/0766* (2013.01); *G06F 11/0793* (2013.01); *G06F 16/313* (2019.01); *G06F 16/33* (2019.01); *G06F 16/3329* (2019.01); *G06F 16/3344* (2019.01); *G06F 16/90332* (2019.01); *G06F 40/279* (2020.01); *G06N 20/00* (2019.01)

(56) References Cited

U.S. PATENT DOCUMENTS

| | | | |
|---|---|---|---|
| 7,333,487 | B2 | 2/2008 | Novaes |
| 7,428,300 | B1 * | 9/2008 | Drew ............... H04M 3/2254 379/14.01 |
| 7,536,368 | B2 | 5/2009 | Todhunter |
| 7,890,318 | B2 | 2/2011 | Castellani et al. |
| 9,047,643 | B2 | 6/2015 | Menten |
| 2003/0217052 | A1 | 11/2003 | Rubenczyk et al. |
| 2005/0114282 | A1 | 5/2005 | Todhunter |
| 2013/0246453 | A1 | 9/2013 | Menten |
| 2014/0032574 | A1 | 1/2014 | Khan |

FOREIGN PATENT DOCUMENTS

| | | |
|---|---|---|
| JP | 2011-8355 | 1/2011 |
| JP | 2013-257708 | 12/2013 |
| JP | 2015-230522 | 12/2015 |
| KR | 10-2006-0130597 | 12/2006 |
| KR | 10-2014-0126751 | 10/2014 |
| KR | 10-2015-0019474 | 2/2015 |
| KR | 10-1487871 | 2/2015 |
| KR | 10-1547756 | 8/2015 |
| KR | 101547756 B1 * | 8/2015 |

OTHER PUBLICATIONS

Written Opinion with English translation, of the ISA for PCT/KR2017/002704, dated Jun. 19, 2017, 9 pages.

Hui et al., "A Web-based Intelligent Fault Diagnosis System for Customer Service Support", Engineering Applications of Artificial Intelligence, vol. 14, 2001, pp. 537-548.

Campos, "Development in the Application of ICT in Condition Monitoring and Maintenance", Computers in Industry, vol. 60, 2009, pp. 1-20.

Quan et al., "Automatic Fuzzy Ontology Generation for Semantic Help-Desk Support", IEEE Transactions on Industrial Informatics, vol. 2, No. 3, Aug. 2006, pp. 155-164.

Zhang et al., "Configurable Remote Diagnosis System Based on SIC", International Journal of Advanced Manufacturing Technology, 2005, 26, pp. 124-130.

Iung et al., "Conceptual Framework for e-Maintenance: Illustration by e-Maintenance Technologies and Platforms", Annual Reviews in Control, vol. 33, 2009, pp. 220-229.

Extended European Search Report dated Mar. 26, 2019 in European Patent Application No. 17775691.3.

Meystre, Stephane et al, "Automation of a problem list using natural language processing," BMC Medical Informatics and Decision Making, Biomed Central, London, GB, vol. 5, No. 1, Aug. 31, 2005, 16 pages.

Xu, Wei et al, "Detecting large-scale system problems by mining console logs," Proceedings of the ACM SIGOPS 22nd Symposium on Operating Systems Principles, SOSP '09, ACM Press, New York, New York, USA, Oct. 11, 2009, pp. 117-132.

Choi, Sou-Chen, "Machine Learning for Machine Data from a CATI Network," Arxiv.org preprint repository, Oct. 3, 2015, pp. 1-8, retrieved from the Internet: URL:https://arxiv.org/pdf/1510.00772.pdf [retrieved on Mar. 19, 2019].

Potharaju, Rahul et al., "Juggling the Jigsaw: Towards Automated Problem Inference from Network Trouble Tickets," Future Generations Computer Systems, Apr. 2, 2013, pp. 1-15.

Examination Report dated Apr. 13, 2021 in Indian Patent Application No. 201817036113 and English-language translation.

Communication pursuant to Article 94(3) EPC dated May 26, 2021 in European Patent Application No. 17775691.3.

* cited by examiner (a)

(b)

(c)

(d)

DIAGNOSTIC MODEL GENERATING METHOD AND DIAGNOSTIC MODEL GENERATING APPARATUS THEREFOR

This application is the U.S. national phase of International Application No. PCT/KR2017/002704 filed Mar. 14, 2017, which designated the U.S. and claims priority to KR Patent Application No. 10-2016-0040291 filed 1 Apr. 2016, the entire contents of each of which are hereby incorporated by reference.

TECHNICAL FIELD

Apparatuses and methods consistent with the disclosure relate to a diagnostic model for solving an error of an electronic device and an apparatus therefor.

DESCRIPTION OF RELATED ART

Electronic devices have been necessaries of people with the development of technology. If an error occurs in an electronic device in this environment, a user of the electronic device may feel inconvenience and may need an immediate solution to the error.

For example, the user may solve the error of the electronic device by visiting a service center with the electronic device or requesting a visit of a service engineer. Alternatively, the error may be solved by remotely diagnosing the electronic device without moving of the user or the service engineer. For example, an e-Maintenance (e-MT) service may enable the electronic device to remotely solve the error thereof by accessing a management server or to be supported with consumables necessary for the electronic device.

An existing method of solving an error of an electronic device may not provide diagnostic processes respectively appropriate for various situations in consideration of the various situations occurring due to the error of the electronic device.

SUMMARY

Therefore, the disclosure provides generating a diagnostic model of an electronic device and optimum diagnostic processes respectively appropriate for situations occurring due to an error of the electronic device by using the diagnostic model.

According to an aspect of the disclosure, a diagnostic model generating method of a diagnostic model generating apparatus includes extracting at least one keyword from consultation data between a user and a consultant for solving an error of an electronic device, based on the at least one extracted keyword, determining a plurality of diagnostic commands for solving the error and a diagnostic sequence between the plurality of diagnostic commands, and storing a diagnostic model including the plurality of determined diagnostic commands and the determined diagnostic sequence.

According to another aspect of the disclosure, a diagnostic model generating apparatus includes a processor configured to extract at least one keyword from consultation data between a user and a consultant for solving an error of the electronic device and determining a plurality of diagnostic commands for solving the error and a diagnostic sequence between the plurality of diagnostic commands, and a memory configured to store a diagnostic model including the plurality of determined diagnostic commands and the diagnostic sequence.

According to various exemplary embodiments of the disclosure, a recovery time of an electronic device may be reduced by optimizing a diagnostic process of solving an error of the electronic device.

In particular, a satisfaction of a user who wants to solve the error of the electronic device may be improved by providing a diagnostic process reflecting a query of the user.

In addition, effects which may be acquired or predicted according to an exemplary embodiment of the disclosure will be directly or connotatively disclosed in the detailed description of the exemplary embodiment of the disclosure. For example, various effects which are predicted according to an exemplary embodiment of the disclosure will be disclosed in the detailed description which will be described later.

DETAILED DESCRIPTION OF EXAMPLE EMBODIMENTS

Figure 1:
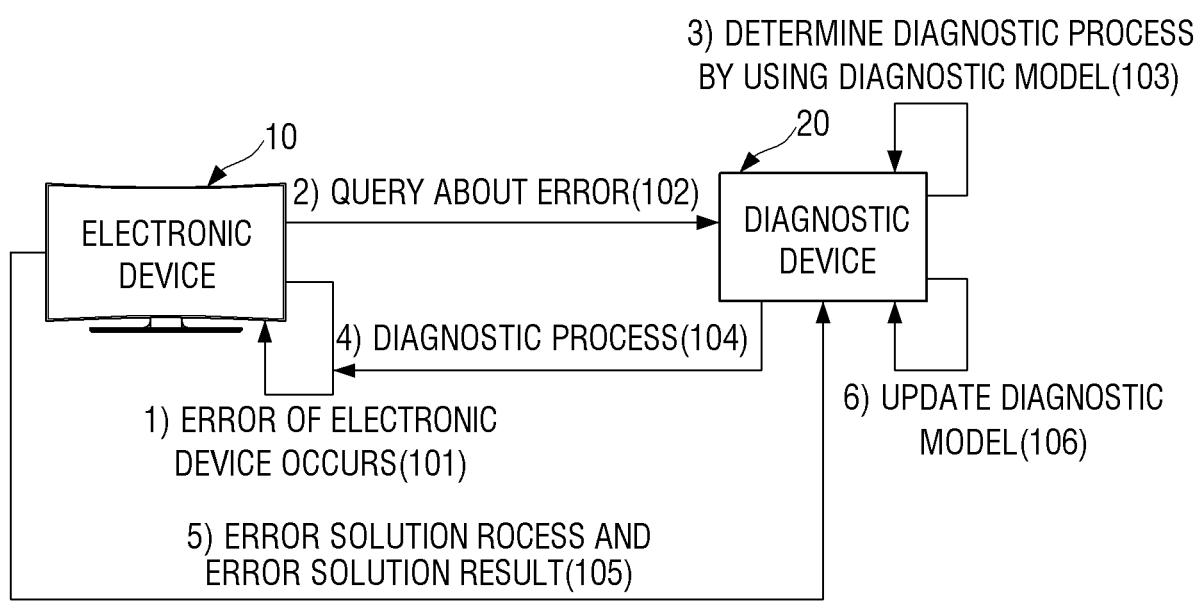
FIG. 1 is a view illustrating a system including an electronic device and a diagnostic device according to an exemplary embodiment of the disclosure.

Hereinafter, various exemplary embodiments of the disclosure will be described with reference to the attached drawings. However, this is not intended to limit the described technology to a particular exemplary embodiment and may be understood as including all of various modifications, equivalents, and/or alternatives. In relation to the description of the drawings, similar reference numerals may be used for similar elements.

As used herein, the terms "have," "may include," "include or comprise", "may include or comprise," and the like designate the presence of features, numbers, steps, operations, components, elements, or a combination thereof that are written in the specification, but do not exclude the presence or possibility of addition of one or more other features, numbers, steps, operations, components, elements, or a combination thereof.

In the disclosure, the term "at least one of "A or B" and "A and/or B"" or "one of A and/or B or more," or the like may include all available combinations of items which are listed together. For example, the expression "A or B," "at least one A and B," or "at least one of A or B" may refer to all of case (1) including at least one A, case (2) including at least B, and case (3) including both of at least one A and at least one B.

Although the terms 'first', 'second', etc. may be used herein to describe various elements regardless of orders and/or importances, these elements may not be limited by these terms. These terms are merely used to distinguish one element from another.

It will be understood that when an element (e.g., a first element) is referred to as being operatively or communicatively coupled with/to or connected to another element (e.g., a second element), the element may be connected to the another element directly or through another element (e.g., a third element). In contrast, when an element (e.g., a first element) is referred to as being "directly coupled with/to" or "directly connected to," there are no intervening element (e.g., a third element) between the element and the another element.

The expression "configured to (or set to) ~" used herein may be changed to "suitable for ~," "having the capacity to ~," "designed to ~," "adapted to ~," "made to ~," or "capable of ~" according to situations. The term "configured to (or set to) ~" may not necessarily refer to "specifically designed to ~" by hardware. Instead, the expression "apparatus configured to ~" may mean that the apparatus is "capable of ~" along with another apparatus or parts. For example, the expression "sub processor configured to (or set to) perform A, B, and C" may refer to a generic-purpose processor (e.g., a CPU or an application processor) capable of performing corresponding operations by executing at least one or more software programs stored in a dedicated processor (e.g., an embedded processor) for performing an corresponding operation or in a memory device.

The terminology used herein is for the purpose of describing particular embodiments merely and is not intended to be limiting of exemplary embodiments. As used herein, the singular forms are intended to include the plural forms as well, unless the context clearly indicates otherwise. Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, may be interpreted as having a meaning that is consistent with their meaning in the context of the relevant art and will not be interpreted in an idealized or overly formal sense unless expressly so defined herein. The terminology defined herein may not be interpreted as excluding exemplary embodiments of the disclosure.

FIG. 1 illustrates a system 1 including an electronic device 10 and a diagnostic device 20 according to an exemplary embodiment of the disclosure.

The electronic device 10 may refer to electronic devices in which errors may occur.

According to an exemplary embodiment, the electronic device 10 may include at least one selected from a smartphone, a tablet PC, a mobile phone, an image phone, an electronic book reader, desktop PC, laptop PC, a netbook computer, a workstation, a server, a PDA, a portable multimedia player (PMP), an MP3 player, a medical device, a camera, and a wearable device. The wearable device may include at least one selected from an accessory type circuit (e.g., a watch, a ring, a bracelet, a necklace, glasses, contact lenses, or a head-mounted-device (HMD)), a fabric or clothing all-in-one type circuit (e.g., electronic clothes), a body attachment type circuit (e.g., a skin pad or tattoo), and a bioimplant type circuit.

According to another exemplary embodiment, the electronic device 10 may include at least one selected from a television, a digital video disk (DVD) player, an audio system, a refrigerator, an air conditioner, a cleaner, an oven, a microwave, a washer, an air cleaner, a set-top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, and an electronic frame.

According to another exemplary embodiment, the electronic device 10 may include at least one selected from various types of medical devices (e.g., various types of portable medical measurement devices (a blood glucose monitoring device, a heart rate monitor, a blood pressure measuring device, a temperature measuring device, and the like), magnetic resonance angiography (MRA), magnetic resonance imaging (MRI), computed tomography (CT), a camera, an ultrasonic machine, and the like), a navigation device, a global navigation satellite system (GNSS), an event data recorder (EDR), a flight data recorder (FDR), a vehicle infotainment device, ship electronic equipment (e.g., a ship navigation system, a gyrocompass, and the like), an avionics system, a security device, a vehicle head unit, an industrial or household robot, a drone, an ATM of a financial institution, point of sales (POS) of a store, and an Internet of Things (IoT) device (e.g., a light bulb, various types of sensors, a sprinkler device, a fire alarm, a thermostat, a streetlamp, a toaster, sporting equipment, a hot water tank, a heater, a boiler, or the like).

According to another exemplary embodiment, the electronic device 10 may include at least one selected from furniture, building and/or structure, a part of a vehicle, an electronic board, an electronic signature receiving device, a projector, and various types of meters (e.g., a water, electricity, gas, or wave meter, and the like).

The electronic device 10 may be flexible or may be a combination of two of various types of devices as described above. The electronic device 10 according to the exemplary embodiment of the disclosure is not limited to the above-described devices.

The term "user" used herein may refer to a person who uses the electronic device 10 or an apparatus (e.g., an artificial intelligence (AI) electronic device) which uses the electronic device 10.

The diagnostic device 20 may be a device which diagnoses the error of the electronic device 10 and provides a diagnostic process for recovering or minimizing the error.

The diagnostic device 20 may be one of exemplary devices of the electronic device 100 described above.

Alternatively, the diagnostic device 20 may be a seller who sales the electronic device 10 or a management server which is operated by a service provider who supports services. In this case, a server may include a cloud server. In general, the cloud server may be used according to a method of registering data by using a software environment regardless of fixed hardware like cloud floating in an internet environment and using the registered data. There may be several service types of the cloud. For example, services may be classified into Software as a Service (Saas), Platform as a Service (PaaS), Hardware as a Service (HaaS), Infrastructure as a Service (IaaS), and the like according to service characteristics which may be slightly different from one another according to providers but may be the same as one another in terms of concepts.

The diagnostic device 20 may be a diagnostic model generating apparatus of the disclosure. Alternatively, the diagnostic device 20 may be an additional apparatus which is physically separated from the diagnostic model generating apparatus but is connected to the diagnostic model generating apparatus through a network. If the diagnostic model generating apparatus exists as the additional apparatus, the diagnostic model generating apparatus may be one of various types of exemplary devices of the electronic device 10 or the diagnostic device 20 as described above.

Referring to FIG. 1, the error of the electronic device 10 may be solved or recovered through a diagnostic process provided by the diagnostic device 20.

For example, if the error occurs in the electronic device 10 in operation 10, the electronic device 10 may acquire a query requesting a solution to the error of the electronic device 10. For example, if the user inputs the query about the error through an error solution interface provided by the electronic device 10, the electronic device 10 may acquire the query input by the user. Alternatively, if the error occurs in the electronic device 10, the electronic device 10 may acquire the query by automatically generating the query about the error of the electronic device 10.

In operation 102, the electronic device 10 may transmit the query about the error of the electronic device 10 to the diagnostic device 20.

In operation S103, the diagnostic device 20 may determine the diagnostic process for solving the error of the electronic device 10 based on the acquired query. The diagnostic process may include diagnostic commands for diagnosis and a diagnostic sequence between the diagnostic commands. In this case, the diagnostic device 20 may determine the diagnostic process for solving the error of the electronic device 10 by using the diagnostic model generated based on consultation data. For example, the diagnostic model may include at least one selected from a software module and a database necessary for an operation of the software module. The consultation data may be dialogue data that the user and a consultant have for solving errors occurring in the same types of electronic devices as the electronic device 10 or in similar types of electronic devices to the electronic device 10.

According to an exemplary embodiment, the diagnostic model may be generated from the diagnostic model generating apparatus. For example, if the diagnostic device 20 is the diagnostic model generating apparatus, the diagnostic model may be generated from the diagnostic device 20. In this case, the diagnostic device 20 may determine the diagnostic process for solving the error of the electronic device 10 by using the generated diagnostic model.

According to another exemplary embodiment, if the diagnostic model generating apparatus is the additional apparatus which is connected to the diagnostic device 20 through the network, the diagnostic device 20 may acquire the diagnostic model, which is generated by the diagnostic model generating apparatus, through the network. Also, the diagnostic device 20 may determine the diagnostic process for solving the error of the electronic device 10 by using the acquired diagnostic model.

According to another exemplary embodiment, if the diagnostic model generating apparatus is the additional apparatus which is connected to the diagnostic device 20 through the network, the diagnostic device 20 may transmit the query, which is acquired by the electronic device 10, to the diagnostic model generating apparatus. In this case, the diagnostic model generating apparatus may determine the diagnostic process based on the acquired query and transmit the determined diagnostic process to the diagnostic device 20 through the network.

If the diagnostic process is determined, the diagnostic device 20 may transmit the determined diagnostic process to the electronic device 10 in operation 104.

The electronic device 10 may execute at least one diagnostic command for solving the error of the electronic device 10 according to the diagnostic process received from the diagnostic device 20. For example, the diagnostic command may be a control command for automatically controlling the electronic device 10, a request command for requesting a manipulation of the electronic device 10 or checking of a state of the electronic device 10 from the user, or the like.

If the diagnostic process is difficult to be performed or an unexpected situation occurs while the diagnostic command is executed according to the diagnostic process, the electronic device 10 may retransmit the query requesting a solution to the occurring situation to the diagnostic device 20. The diagnostic device 20 may determine an additional diagnostic process for solving the error of the electronic device 10 based on the acquired query and transmit the determined additional diagnostic process to the electronic device 10.

As a result of executing the diagnostic command, the electronic device 10 may solve the error of the electronic device 10. In this case, the electronic device 10 may transmit at least one selected from an error solution process and an error solution result to the diagnostic device 20 in operation 105.

In operation 106, the diagnostic device 20 which receives the at least one selected from the error solution process and the error solution result may update the stored diagnostic model by using at least one selected from the acquired error solution process and error solution result.

Figure 2:
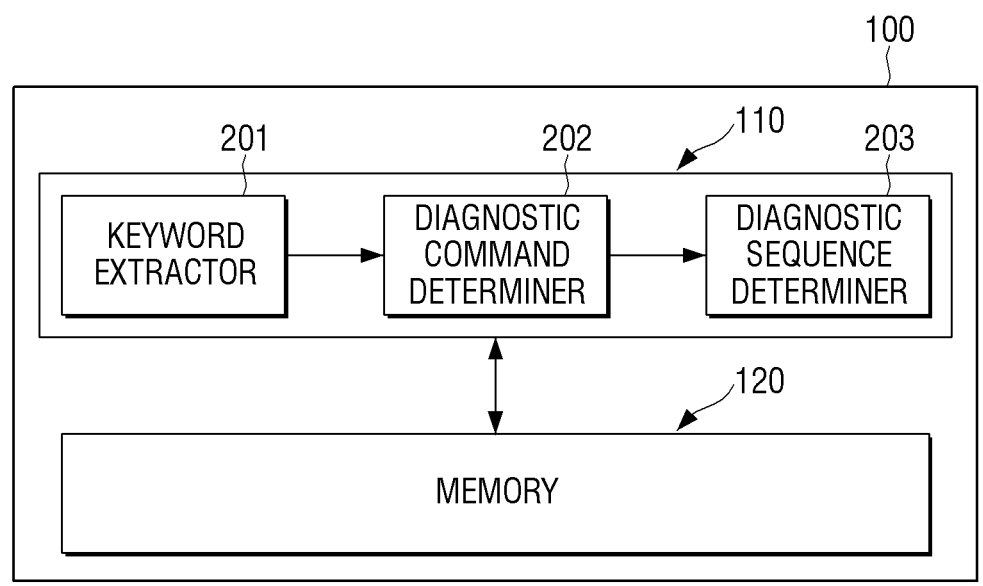
FIG. 2 is a block diagram of a diagnostic model generating apparatus according to an exemplary embodiment of the disclosure.

FIG. 2 is a block diagram of a diagnostic model generating apparatus 100 according to an exemplary embodiment of the disclosure.

As described above, the diagnostic model generating apparatus 100 may be an apparatus which is the same as the diagnostic device 20 or an additional apparatus which is connected to the diagnostic device 20 through a network.

Referring to FIG. 2, the diagnostic model generating apparatus 100 may include at least one processor 110 and a memory 120.

The at least one processor 110 may perform a function of controlling an overall operation of the diagnostic model generating apparatus 100. The processor 110 may be classified into a keyword extractor 201, a diagnostic command determiner 202, and a diagnostic sequence determiner 203 according to purposes or functions. In this case, elements mentioned above may be classified according to purposes for convenience of description and may be integrated or divided or may have other types of names.

The keyword extractor 201 may extract at least one keyword from consultation data between a user and a consultant for solving the error of the electronic device 10. In this case, the keyword extractor 201 may extract an error keyword and a diagnostic keyword from the consultation data by using a language processing algorithm. For example, the language processing algorithm may be a Neuro-Linguistic Programming algorithm, a Natural language processing algorithm, or the like or may include various types of algorithms for analyzing and processing languages of persons and combinations of the algorithms.

If the keyword is extracted, the diagnostic command determiner 202 may determine a plurality of diagnostic commands for solving the error of the electronic device 10 based on the at least one extracted keyword. For example, if the at least one extracted keyword includes an error keyword, the diagnostic command determiner 202 may determine a plurality of diagnostic commands related to the error keyword.

According to an exemplary embodiment, the diagnostic command determiner 202 may determine to map the error keyword on the acquired diagnostic commands according to weights. In this case, the diagnostic command determiner 202 may determine to map the error keyword on the acquired diagnostic commands according to weights. Also, the diagnostic command determiner 202 may determine to map the error keyword on the acquired diagnostic commands maps according to weights by using at least one selected from a statistic algorithm and a machine-learning algorithm.

If the plurality of diagnostic commands are determined, the diagnostic sequence determiner 203 may determine a diagnostic sequence between the plurality of diagnostic commands.

As an example, the diagnostic sequence determiner 203 may determine the diagnostic sequence between the diagnostic commands according to correlations between the diagnostic commands. In this case, the diagnostic commands may be connected to one another according to respective weights, and the diagnostic sequence may be determined according to the weights. In this case, the diagnostic sequence determiner 201 may calculate the correlations between the diagnostic commands by using at least one selected from the statistic algorithm and the machine learning algorithm and determine the diagnostic sequence between the diagnostic commands according to the correlations.

As another example, the diagnostic sequence determiner 203 may determine a diagnostic sequence between diagnostic commands respectively corresponding to a plurality of keywords according to orders in which the plurality of keywords are generated from consultation data.

As another example, the diagnostic sequence determiner 203 may determine a diagnostic sequence between diagnostic commands respectively corresponding to a plurality of keywords according to frequencies in which the plurality of keywords are generated from the consultation data.

If a query requesting a solution to the error of the electronic device 10 is acquired from the electronic device 10, the processor 110 may determine a diagnostic process which includes a plurality of diagnostic commands including a diagnostic command corresponding to a keyword extracted from the acquired query and a diagnostic sequence between the plurality of diagnostic commands. Here, the processor 110 may determine the diagnostic command corresponding to the keyword extracted from the acquired query as a start diagnostic command of the diagnostic process.

Also, if at least one selected from the error solution process and the error solution result is acquired, the processor 110 may update the diagnostic model by using the at least one selected from the error solution process and the error solution result.

Figure 3:
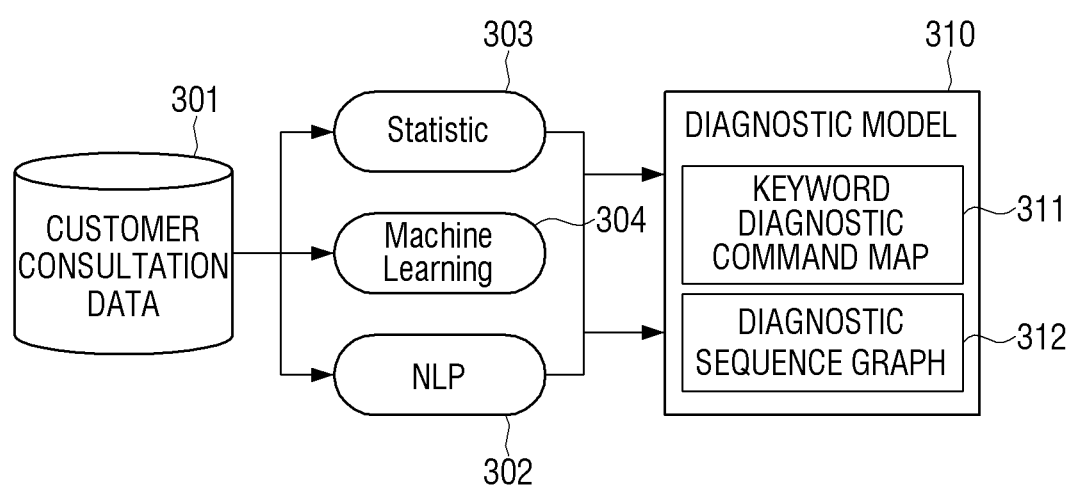
FIG. 3 is a view illustrating a process of generating a diagnostic model according to an exemplary embodiment of the disclosure.

FIG. 3 is a view illustrating a process of generating a diagnostic model according to an exemplary embodiment of the disclosure.

Referring to FIG. 3, the diagnostic model generating apparatus 100 may acquire customer consultation data 301 which is acquired from a dialogue that a user and a consultant have for solving the electronic device 10 in which an error occurs. For example, the consultation data 301 may be data collected by a customer service center which solves the error of the electronic device 10.

The diagnostic model generating apparatus 100 may extract at least one keyword from consultation data 301. For example, the diagnostic model generating apparatus 100 may extract an error keyword related to an error state of the electronic device 10 and a diagnostic keyword for solving the error of the electronic device 10. In this case, the diagnostic model generating apparatus 100 may extract the error keyword and the diagnostic keyword by analyzing the consultation data 301 by using an NLP algorithm 302.

Figure 5:
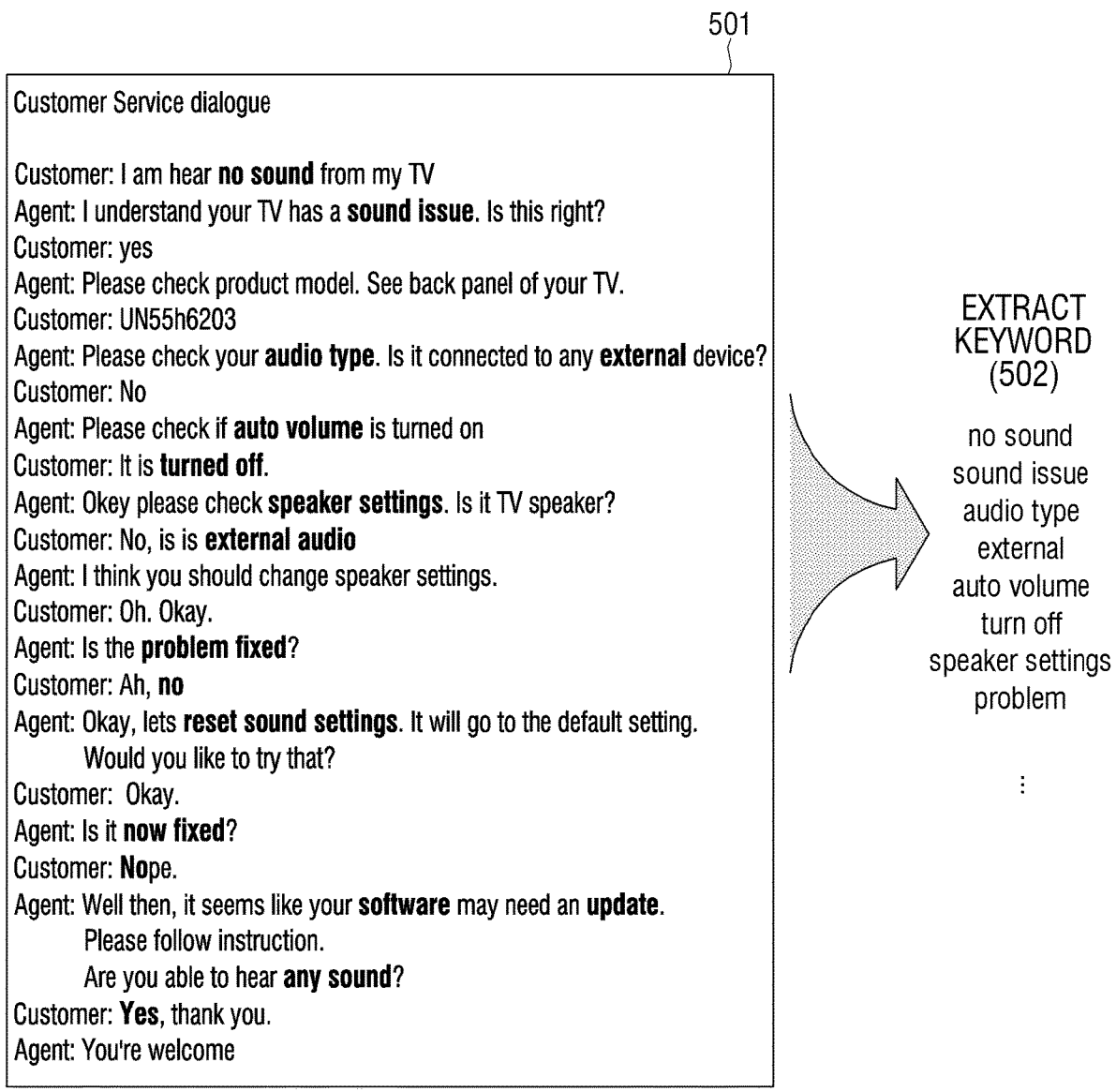
FIG. 5 is a view illustrating a process of extracting a keyword from consultation data according to an exemplary embodiment of the disclosure.

In detail, referring to FIG. 5, consultation data 501 may exist between a user and a consultant. In this case, the diagnostic model generating apparatus 100 may extract 502 at least one keyword from the consultation data 501. For example, the diagnostic model generating apparatus 100 may extract "no sound" and "sound issue" as error keywords of the electronic device 10. The diagnostic model generating apparatus 100 may extract "audio type," "external," "auto volume," "turn off," "speaker settings," and the like as diagnostic keywords. The diagnostic keywords may be keywords for solving the error of the electronic device 10, i.e., keywords related to an error cause, an error state, a solution plan, and an error solution result. In this case, the error keyword and the diagnostic keyword may be the same as each other.

Referring to FIG. 3 again, based on the extracted keywords, the diagnostic model generating apparatus 100 may generate a diagnostic model 310 which provides a diagnostic process. The diagnostic model 310 may include a keyword diagnostic command map 311 on which diagnostic commands related to an extracted keyword is mapped.

The diagnostic model generating apparatus 100 may generate the keyword diagnostic command map 311 by acquiring diagnostic commands related to at least one of the extracted keywords.

The diagnostic model generating apparatus 100 may acquire a diagnostic command related to the extracted keyword from the memory 120 of the diagnostic model generating apparatus 100 or from an apparatus installed outside the diagnostic model generating apparatus 100.

The diagnostic model generating apparatus 100 may generate the keyword diagnostic command map 311 by mapping the extracted keyword on the acquired diagnostic commands. The diagnostic model generating apparatus 100 may respectively map the keyword on the acquired diagnostic commands according to weights. In this case, the diagnostic model generating apparatus 100 may map the keyword on the diagnostic commands by using at least one selected from the statistic algorithm 303 and the machine learning algorithm 304.

Figure 6:
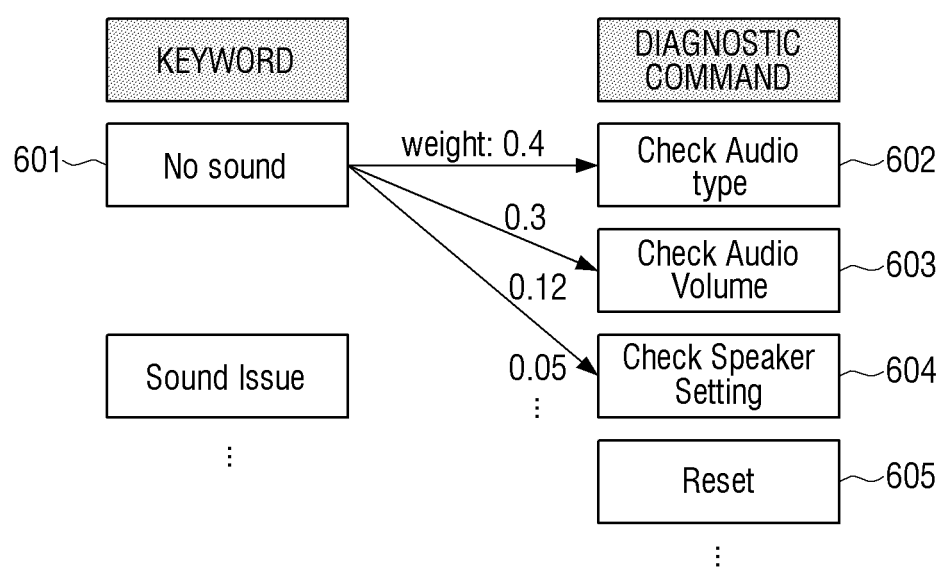
FIG. 6 is a view illustrating a diagnostic command map according to an exemplary embodiment of the disclosure.

In detail, referring to FIG. 6, the diagnostic model generating apparatus 100 may acquire diagnostic commands related to an error keyword extracted from consultation data (e.g., 301 of FIG. 3). Also, the diagnostic model generating apparatus 100 may map the extracted error keyword on the acquired diagnostic commands according to weights. For example, if "No sound" 601 exists as the extracted keyword, the diagnostic model generating apparatus 100 may acquire diagnostic command "Check Audio type" 602, diagnostic command "Check Auto volume" 603, diagnostic command "Check Speaker setting" 604, and diagnostic command "Reset" 605 as diagnostic commands related to the keyword "No sound" 601. Also, the diagnostic model generating apparatus 100 may map the keyword "No sound" 601 on the diagnostic command "Check Audio type" 602, the diagnostic command "Check Auto volume" 603, the diagnostic command "Check Speaker setting" 604, and the diagnostic command "Reset" 605 according to weights of 0.4, 0.3, 0.12, and 0.05 by using at least one selected from a statistic algorithm (e.g., 303 of FIG. 3) and a machine learning algorithm (e.g., 304 of FIG. 3).

Referring to FIG. 3 again, if the keyword diagnostic command map 311 is generated according to a mapping result between a keyword and a diagnostic command, the diagnostic model generating apparatus 100 may generate a diagnostic sequence graph 312 including a diagnostic sequence between diagnostic commands.

For example, the diagnostic model generating apparatus 100 may acquire respective orders of keywords from the consultation data 301. Also, the diagnostic model generating apparatus 100 may determine a diagnostic sequence according to the acquired respective orders of the keywords. For example, the diagnostic model generating apparatus 100 may determine orders of diagnostic commands which respectively correspond to diagnostic keywords and are the same as or similar to the orders in which the diagnostic keywords are generated from the consultation data 301. In this case, the diagnostic model generating apparatus 100 may perform a sequence according to weights by allocating a higher weight to a diagnostic command having a faster diagnostic order than a diagnostic command having a slower diagnostic order and determining a diagnostic sequence.

As another example, the diagnostic model generating apparatus 100 may acquire generation frequencies of keywords from the consultation data 310. Also, the diagnostic model generating apparatus 100 may determine a diagnostic sequence according to the acquired generation frequencies of the keywords. For example, the diagnostic model generating apparatus 100 may perform a sequence according to weights by allocating a higher weight to a diagnostic command corresponding to a diagnostic keyword having a high generation frequency than a diagnostic command having a low generation frequency in the consultation data 301 and determining a diagnostic sequence.

As another example, the diagnostic model generating apparatus 100 may analyze correlations between diagnostic commands respectively corresponding to keywords by putting the keywords into input values of the statistic algorithm 303 or the machine learning algorithm 304. Also, the diagnostic model generating apparatus 100 may determine a diagnostic sequence between diagnostic commands by connecting diagnostic commands having high correlations to one other.

Figure 7:
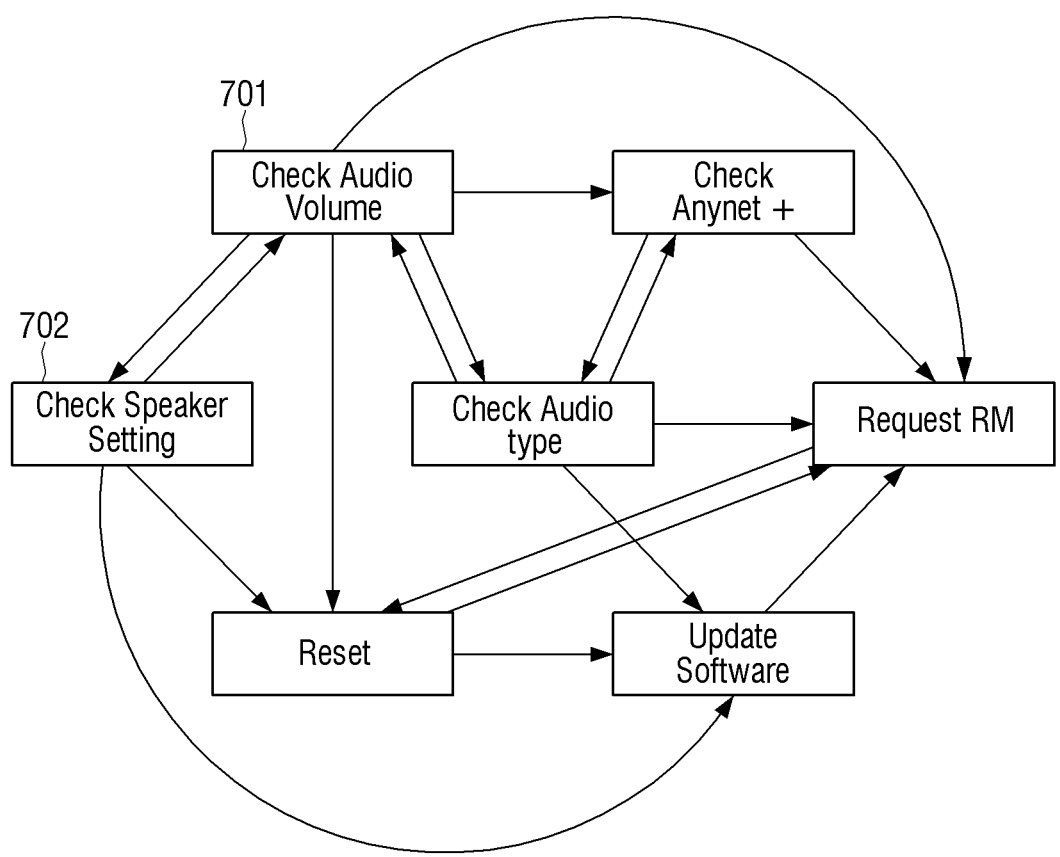
FIG. 7 is a view illustrating a diagnostic sequence graph according to an exemplary embodiment of the disclosure.

In detail, referring to FIG. 7, the diagnostic sequence graph 312 may be generated for enabling a multi-directional diagnosis between diagnostic commands. For example, the diagnostic sequence graph 312 may be generated in a graph form for enabling a bidirectional diagnosis between diagnostic commands. For example, if diagnostic command "Check Auto Volume" 701 is executed as a start diagnostic command, the diagnostic model generating apparatus 100 may select diagnostic commands having high weights from diagnostic commands connected to the diagnostic command "Check Auto Volume" 701 and execute the selected diagnostic commands. Referring to FIG. 7, if a diagnostic command having a high weight is diagnostic command "Check Speaker Setting" 702 among the diagnostic commands connected to the diagnostic command "Check Auto Volume" 701, the diagnostic model generating apparatus 100 may perform a function of the diagnostic command "Check Auto Volume" (701) and a function of the diagnostic command "Check Speaker Setting" (702) in a next order. As described above, the diagnostic model generating apparatus 100 may perform a diagnosis according to a diagnostic sequence complying with weights between diagnostic commands.

Figure 4:
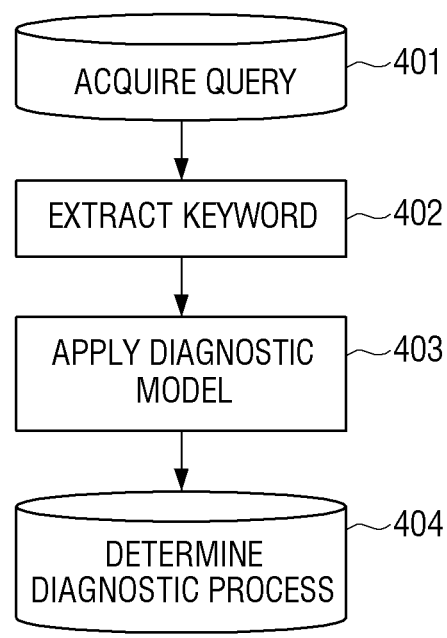
FIG. 4 is a view illustrating a process of determining a diagnostic process by using a diagnostic model according to an exemplary embodiment of the disclosure.

Referring to FIG. 3 again, if the diagnostic model generating apparatus 100 generates a diagnostic model, the diagnostic model generating apparatus 100 may determine a diagnostic process of the electronic device 10 by using the generated diagnostic model 310 as shown in FIG. 4.

Referring to FIG. 4, the diagnostic model generating apparatus 100 may directly recover the electronic device 10, in which the error occurs, by using the diagnostic model generated in FIG. 3 or may provide a user of the electronic device 10 with a method of recovering the electronic device 10.

As the error occurs in the electronic device 10, a query requesting a solution to the error may be acquired from the electronic device 10 in operation 401. The acquired query may be a query which is requested by a user who uses the electronic device 10 or a query which is automatically requested by the electronic device 10 according to the error of the electronic device 10.

In operation 402, the diagnostic model generating apparatus 100 may extract a keyword from the acquired query. For example, the diagnostic model generating apparatus 100 may extract an error keyword related to the error. In this case, the diagnostic model generating apparatus 100 may extract the keyword from the query acquired from the electronic device 10 by using a language processing algorithm.

The diagnostic model generating apparatus 100 may directly acquire a keyword from the electronic device 10. For example, if the electronic device 10 includes a keyword extractor (not shown) including a language processing algorithm, the keyword extractor of the electronic device 10 may extract a keyword related to the error from the query of the user using the electronic device 10. Also, the electronic device 10 may transmit the extracted keyword to the diagnostic model generating apparatus 100 through a network. The diagnostic model generating apparatus 100 may determine the keyword received from the electronic device 10 as the keyword related to the error of the electronic device 10. In this case, the determination of the keyword by the diagnostic model generating apparatus 100 may be included in the process of extracting the keyword by the diagnostic model generating apparatus 100.

In operation 403, the diagnostic model generating apparatus 100 may apply the extracted keyword to the diagnostic model (e.g., 310 of FIG. 3). For example, the diagnostic model generating apparatus 100 may determine a diagnostic command corresponding to a keyword corresponding to the diagnostic model. Also, the diagnostic model generating apparatus 100 may determine the determined diagnostic command as a start diagnostic command of a diagnostic process for solving the error of the electronic device 10.

In detail, the diagnostic model generating apparatus 100 may apply the error keyword to a keyword diagnostic command map (e.g., 311 of FIG. 3) of the diagnostic model (e.g., 310 of FIG. 3). As the applying result, the diagnostic model generating apparatus 100 may determine a diagnostic command having a high weight among diagnostic commands mapped on the error keyword. Also, the diagnostic model generating apparatus 100 may determine the diagnostic command having the high weight as the start diagnostic command of the diagnostic process for solving the error of the electronic device 10.

In operation 404, the diagnostic model generating apparatus 100 may determine the diagnostic process for solving the error of the electronic device 10 based on the diagnostic sequence included in the diagnostic sequence graph (e.g., 312 of FIG. 3) of the diagnostic model (e.g., 310 of FIG. 3). For example, the diagnostic model generating apparatus 100 may determine a set of diagnostic commands, which start from the start diagnostic command and follow diagnostic orders complying with the determined diagnostic sequence, as the diagnostic process for solving the error of the electronic device 10.

Figure 8:
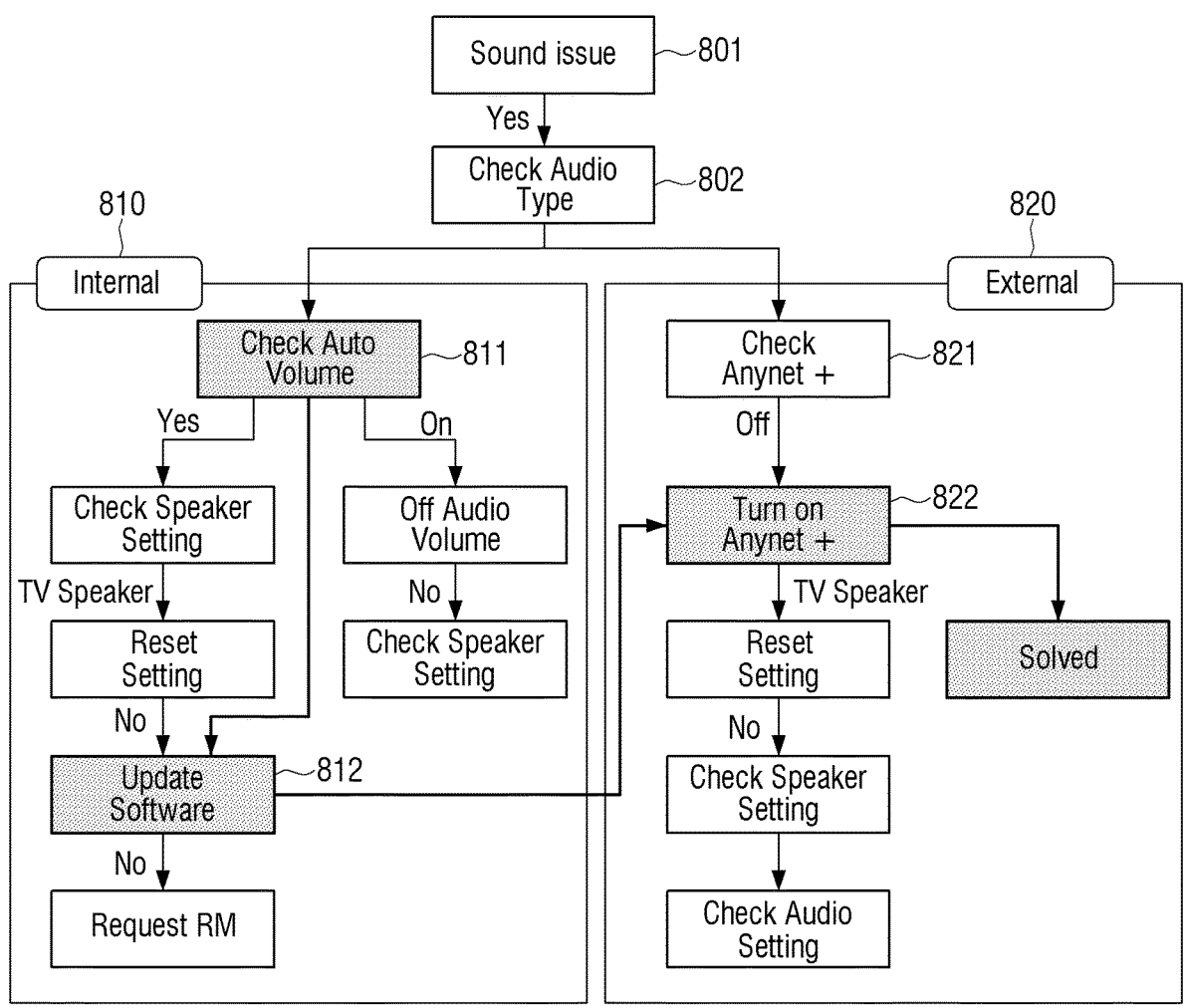
FIG. 8 is a view illustrating a diagnostic process of an electronic device according to an exemplary embodiment of the disclosure.

FIG. 8 is a view schematically illustrating a diagnostic process of the electronic device 10 according to the disclosure.

In general, if an error occurs in the electronic device 10, the error may be solved by performing a tree type diagnosis proceeding in one direction. For example, if error "Sound issue" 801 occurs as the error of the electronic device 10, diagnostic command "Check Audio Type" 802 may be executed as a start diagnostic command, and a determination may be made as to whether an audio type of the electronic device 10 is an internal audio type or an external audio type according to a performance result of a function of a diagnostic command. Here, if the internal audio type is determined, diagnostic command "Check Auto Volume" 811 may be executed. If the external audio type is determined, diagnostic command "Check Anynet+" 821 may be executed.

In this method, since the start diagnostic command for solving "Sound issue" may be fixed, and a diagnostic sequence may proceed in one direction, a diagnostic process may lengthen. Also, if the diagnostic process goes into a category 810 of one node 811 due to a tree type structure, the diagnostic process may be difficult to move into a category 820 of another node 821.

The diagnostic model generating apparatus 100 of the disclosure may have a variable diagnostic start point which is not limited to a tree type diagnostic process as described above.

As an example, the diagnostic model generating apparatus 100 may acquire a query requesting a solution to an error from the electronic device 10 and extract a keyword by using the acquired query. Also, the diagnostic model generating apparatus 100 may determine a diagnostic command corresponding to the extracted keyword as a start diagnostic command for performing the diagnostic process. In this case, the start diagnostic command for performing the diagnostic process may vary with a type of the acquired query.

For example, if the error "Sound issue" 801 occurs as the error of the electronic device 10, various types of queries requesting a solution to the error may be generated. In this case, various types of keywords may be extracted according to various types of queries by using a language processing algorithm, and thus the start diagnostic command for performing the diagnostic process may vary.

As shown in FIG. 8, if the error "Sound issue" 801 occurs as the error of the electronic device 10, the diagnostic model generating apparatus 100 may omit a process of performing the diagnostic command "Check Audio Type" 802 and execute the diagnostic command "Check Auto Volume" 811 as a start diagnostic command of a diagnostic sequence.

Also, the diagnostic model generating apparatus 100 may perform the diagnostic process in a bidirectional graph form without being limited to the tree type diagnostic process described above.

For example, as shown in FIG. 8, the diagnostic model generating apparatus 100 may perform a diagnostic process included in the category 810 of one node and perform a diagnostic process included in the category 820 of another node. Alternatively, if a plurality of sub nodes are connected to one another above one node, the diagnostic model generating apparatus 100 may perform a diagnostic process included in a category of a sub node and perform a diagnostic process included in a category of one node positioned above the sub node. In other words, a connection form between nodes may not be limited, and a movement between categories may be free.

For example, referring to FIG. 8, after diagnostic command "Update Software" 812 included in a category 810 of an internal audio type is executed, diagnostic command "Turn on Anynet+" 822, which is not subordinate to the category 810 of the internal audio type and is included in an external audio category 820, may be executed.

As described above with reference to FIG. 8, a diagnostic process of the disclosure may be distinguished from a general tree type diagnostic process by corresponding to each diagnostic command included in a tree type diagnostic process but may not mean that is formed as a tree type.

FIGS. 9A through 9D are views illustrating a usage of diagnosing the electronic device 10 by using the diagnostic model generating apparatus 100, according to an exemplary embodiment of the disclosure.

Figure 9A:
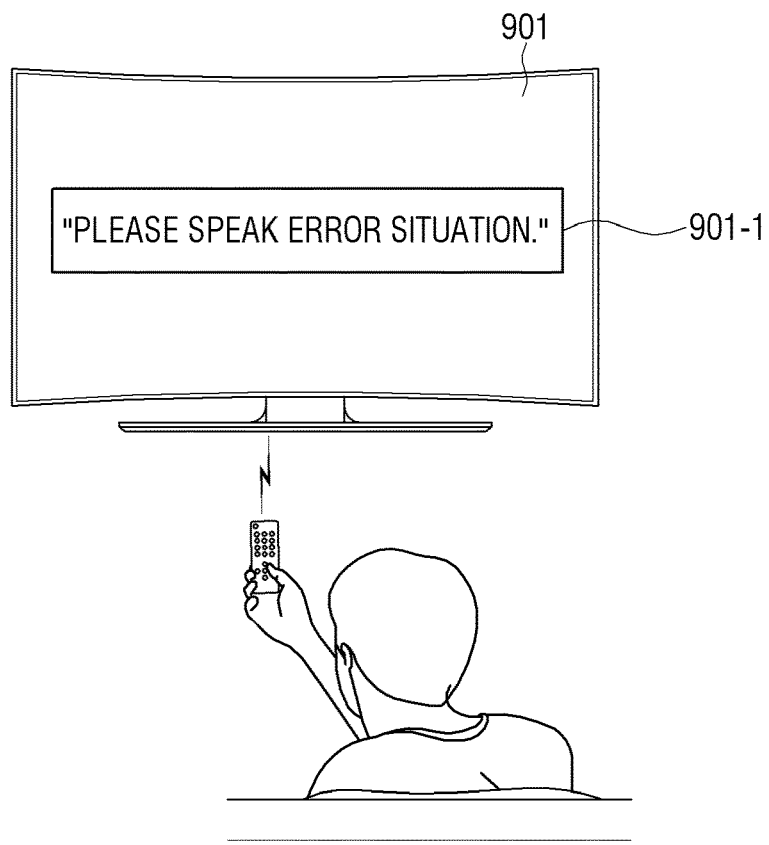
FIGS. 9A and 9B are views illustrating a usage for diagnosing an electronic device, according to an exemplary embodiment of the disclosure.
Figure 9A:
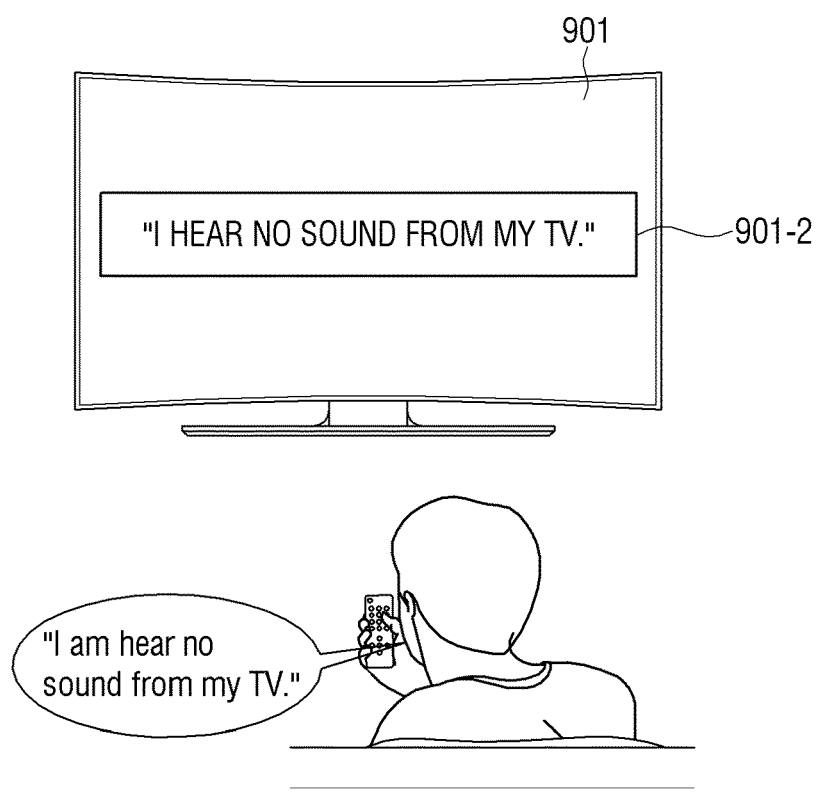

Referring to FIG. 9A, if an error occurs in the electronic device 10, and a user selects identification information of an error diagnostic application, an execution screen 901 of the error diagnostic application may be displayed. Alternatively, the electronic device 10 may determine that the error occurs, by itself and thus display the execution screen 901 of the error diagnostic application. Alternatively, if the electronic device 10 is a TV, the electronic device 10 may display the execution screen 901 of the error diagnostic application in response to a manipulation of the user who selects an error diagnostic button (not shown) of a remote controller. Here, a message 901-1 which requests an input of an error situation may be provided on the execution screen 901 of the error diagnostic application.

Figure 9B:
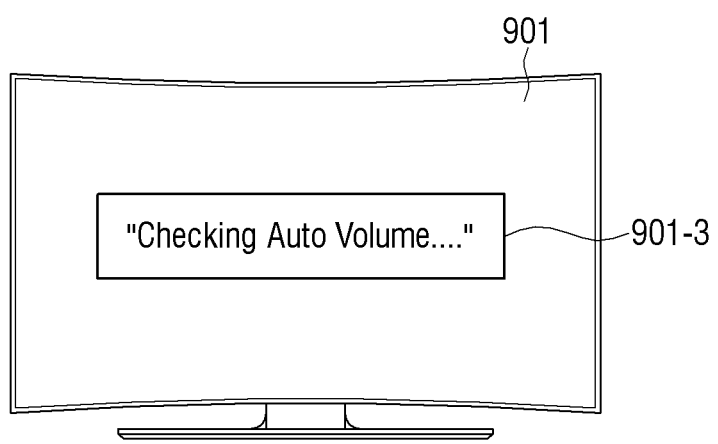
Figure 9B:
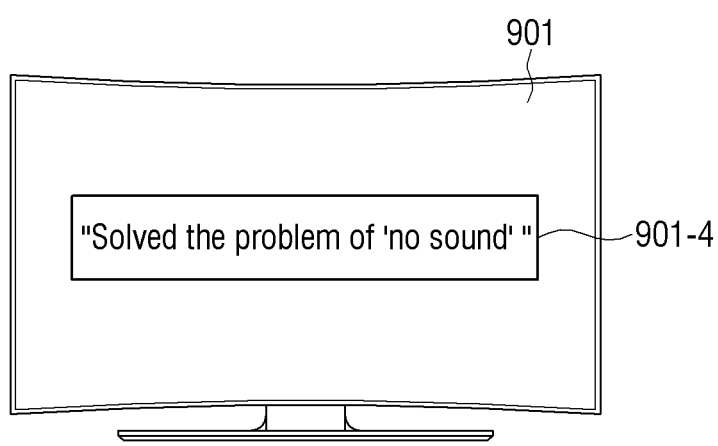

As shown in FIG. 9B, the user may input a query about the error of the electronic device 10. For example, the user may input the query about the error of the electronic device 10 as a text or may utter the query about the error. As an example, the user may utter "I hear no sound from my TV." The electronic device 10 may display a query, which is input for a check of the user, in a form of a message 901-2.

The electronic device 10 which receives the input of the query may transmit the input query to the diagnostic device 20. The diagnostic device 20 may determine a diagnostic process for solving the error of the electronic device 10 based on the acquired query. In this case, the diagnostic device 20 may determine the diagnostic process by using a diagnostic model of the disclosure.

If the diagnostic process is determined, the diagnostic device 20 may transmit the determined diagnostic process to the electronic device 10. The electronic device 10 may execute a diagnostic command according to the received diagnostic process. For example, if a start diagnostic command complying with the diagnostic process is diagnostic command "Check Auto Volume," the electronic device 10 may check whether there is no problem in function "Auto Volume" provided by the electronic device 10. In this case, as shown in FIG. 9C, the electronic device 10 may display a state, where a diagnostic command of the electronic device 10 is being executed, as a message 901-3.

If the diagnostic command is not capable of being automatically executed, the electronic device 10 may display a message (not shown) requesting a manipulation of the electronic device 10 on a screen and execute the diagnostic command according to a manipulation of the user.

The electronic device 10 may execute a next diagnostic command according to an execution result of the diagnostic command. If the error of the electronic device 10 is determined as being solved as the execution result, a message 901-4 showing the solution to the error of the electronic device 10 may be displayed on the screen as shown in FIG. 9D.

Figure 10:
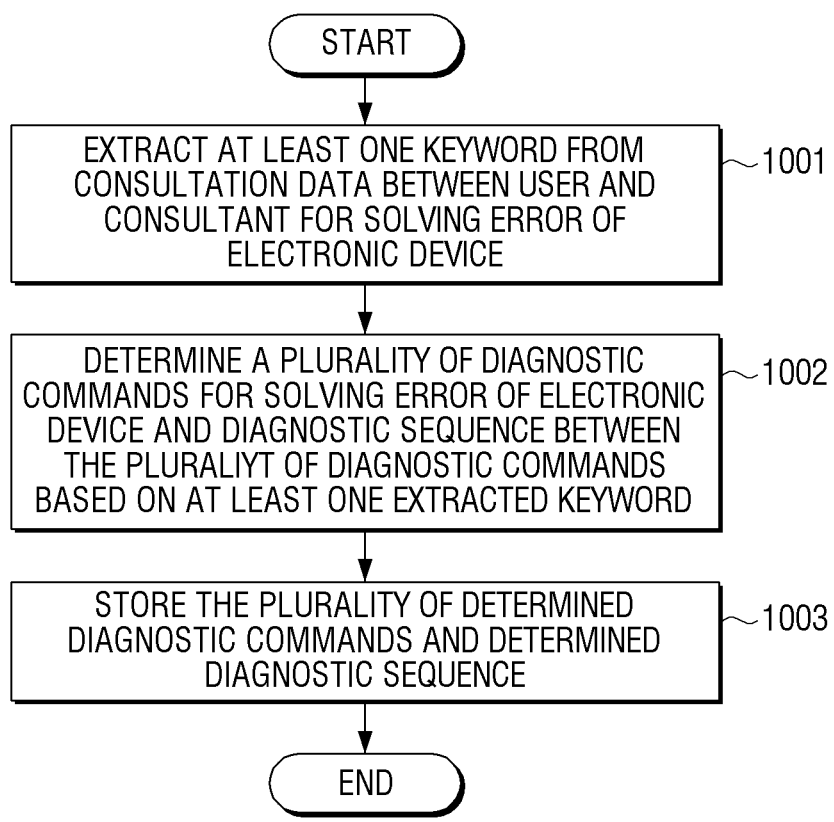
FIGS. 10 and 11 are flowcharts of a method of generating a diagnostic model by a diagnostic model generating apparatus, according to exemplary embodiments of the disclosure.

FIG. 10 is a flowchart of a method of generating a diagnostic model by the diagnostic model generating apparatus 100, according to an exemplary embodiment of the disclosure.

In operation S1001, the diagnostic model generating apparatus 100 may extract at least one keyword from consultation data between a user and a consultant for solving an error of the electronic device 10.

In this case, the diagnostic model generating apparatus 100 may extract an error keyword and a diagnostic keyword from the consultation data by using a language processing algorithm.

If the at least one keyword is extracted, the diagnostic model generating apparatus 100 may determine a plurality of diagnostic commands for solving the error of the electronic device 10 and a diagnostic sequence between the plurality of diagnostic commands based on the at least one extracted keyword in operation S1002.

For example, if the at least one extracted keyword includes an error keyword, the diagnostic model generating apparatus 100 may determine a plurality of diagnostic commands related to the error keyword. Here, the diagnostic model generating apparatus 100 may determine to map the extracted error keyword on the acquired diagnostic commands according to weights. In particular, the diagnostic model generating apparatus 100 may determine to map the extracted error keyword on the acquired diagnostic commands according to weights by using at least one selected from a statistic algorithm and machine learning algorithm.

As another example, the diagnostic model generating apparatus 100 may determine the diagnostic sequence between the diagnostic commands according to correlations between the diagnostic commands. In this case, the diagnostic model generating apparatus 100 may determine the diagnostic sequence between the diagnostic commands according to the correlations between the diagnostic commands by using at least one selected from the statistic algorithm and the machine learning algorithm.

As another example, the diagnostic model generating apparatus 100 may determine a diagnostic sequence between diagnostic commands respectively corresponding to a plurality of keywords according to orders in which the plurality of keywords are generated.

As another example, the diagnostic model generating apparatus 100 may determine a diagnostic sequence between diagnostic commands respectively corresponding to a plurality of keywords according to frequencies in which the plurality of keywords are generated from consultation data.

If the plurality of diagnostic commands and the diagnostic sequence between the diagnostic commands are determined, the diagnostic model generating apparatus 100 may store a diagnostic model including the plurality of determined diagnostic commands and the determined diagnostic sequence in the memory 120 in operation S1003.

Figure 11:
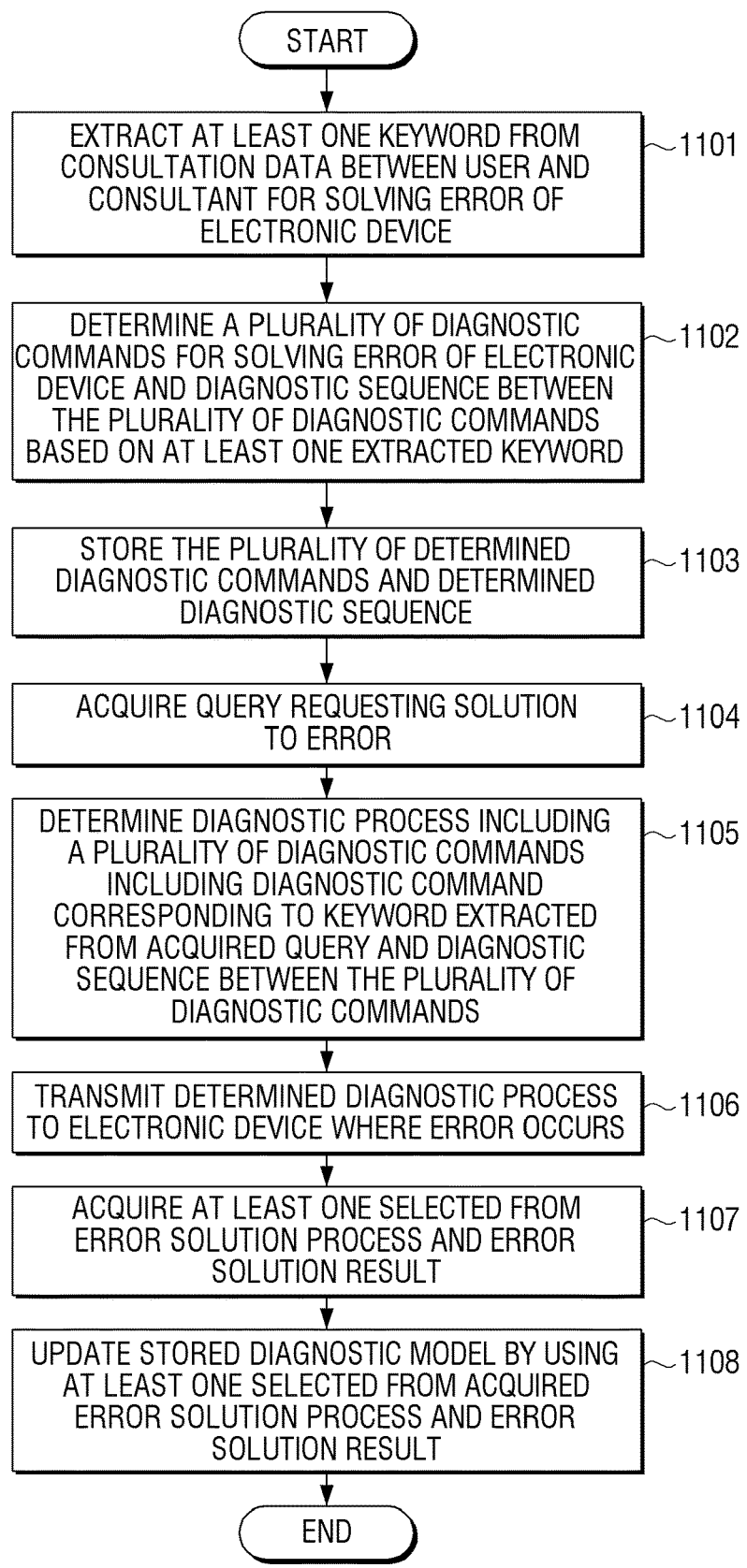

FIG. 11 is a flowchart of a method of generating a diagnostic model by the diagnostic model generating apparatus 100, according to another exemplary embodiment of the disclosure.

In operation S1101, the diagnostic model generating apparatus 100 may extract at least one keyword from consultation data between a user and a consultant for solving an error of the electronic device 10.

If the at least one keyword is extracted, the diagnostic model generating apparatus 100 may determine a plurality of diagnostic commands for solving the error of the electronic device 10 and a diagnostic sequence between the plurality of diagnostic commands based on the at least one extracted keyword in operation S1102.

If the plurality of diagnostic commands and the diagnostic sequence between the plurality of diagnostic commands are determined, the diagnostic model generating apparatus 100 may store a diagnostic model including the plurality of determined diagnostic commands and the determined diagnostic sequence in the memory 120 in operation S1103.

When the diagnostic model is stored in the memory 120, the diagnostic model generating apparatus 100 may acquire a query requesting a solution to the error in operation S1104. For example, the diagnostic model generating apparatus 100 may acquire the query from the electronic device 10.

If the query is acquired, the diagnostic model generating apparatus 100 may determine a plurality of diagnostic commands including a diagnostic command corresponding to a keyword extracted from the acquired query and a diagnostic sequence between the plurality of diagnostic commands by using the generated diagnostic model in operation S1105. In this case, the diagnostic model generating apparatus 100 may determine the diagnostic command corresponding to the keyword extracted from the acquired query as a start diagnostic command of a diagnostic process.

If the diagnostic process is determined, the diagnostic model generating apparatus 100 may transmit the determined diagnostic process to the electronic device 10 where the error occurs in operation S1106.

If the error is solved according to the diagnostic process received by the electronic device 10, the diagnostic model generating apparatus 100 may acquire at least one selected from an error solution process and an error solution result of the electronic device 10 in operation S1107. In operation S1108, the diagnostic model generating apparatus 100 may update the stored diagnostic model by using at least one selected from the acquired error solution process and error solution result.

The term "module" used herein may include a unit including hardware, software, or firmware, for example, may be compatibly used with the term "logic," "logic block," "part," "circuit," or the like. The "module" may be parts integrated into one, a minimum unit performing one or more functions, or a part thereof. The "module" may be embodied mechanically or electronically, for example, may include an application-specific integrated circuit (ASIC) chip, field-programmable gate arrays(FPGAs), or a programmable logic unit which performs operations and is known or will be developed. At least a portion of an apparatus (e.g., modules or functions thereof) or a method (e.g., operations) may be embodied as an instruction which is stored in a computer readable storage medium (e.g., the memory 120). If the instruction is executed by a processor (e.g., the processor 110), the processor may perform a function corresponding to the instruction. The computer readable recording medium may include a hard disk, a floppy disk, a magnetic medium (e.g., a magnetic tape), an optical recording medium (e.g., CD-ROM, DVD, magnetic-optical medium (e.g., a floptical disk), an embedded memory, or the like. The instruction may include a code which is made by a compiler or a code which may be executed by an interpreter. A module or a program module according to various exemplary embodiments may further include at least one or more of the above-described elements or may further include other types of elements or some of the module or the program module may be omitted. Operations which are performed by the module, the program module, or the other elements according to various exemplary embodiments may be performed sequentially, in parallel, repeatedly, or heuristically, at least some operations may be performed in a different order, or other operations may be added.

What is claimed is:

1. A method comprising:
    obtaining consultation data from a dialogue for solving an error of an electronic device;
    extracting a plurality of keyword from the consultation data, the plurality of keywords having an order based on an order of the extracting;
    based on the plurality of keywords, generating a diagnostic model comprising a plurality of diagnostic commands for solving the error and a diagnostic sequence of diagnostic commands based on uni-directional and bi-directional connections between diagnostic commands determined in accordance with weights allocated based on correlations among the diagnostic commands, wherein the diagnostic sequence is based on the order in which the plurality of keywords is extracted from the consultation data, diagnostic commands connected uni-directionally in the diagnostic model are performable in a sequence in which one of two uni-directionally-connected commands always follows the other of the two uni-directionally-connected commands, and diagnostic commands connected bi-directionally in the diagnostic model are performable in a sequence in which either one of two bi-directionally connected commands follows the other of the two bi-directionally-connected commands;
    storing the diagnostic model;
    obtaining a query requesting a solution to the error;
    identifying an error solution process for the error using the stored diagnostic model, the error solution process comprising error solution diagnostic commands, from the plurality of diagnostic commands, including a start diagnostic command corresponding to a keyword extracted from the obtained query and a diagnostic sequence for performing the error solution diagnostic commands based on the start diagnostic command and directions of the uni-directional and bi-directional connections among diagnostic commands connected to the start diagnostic command in the stored diagnostic model, wherein the error solution process for the error comprises determining a diagnostic command having highest weight as the start diagnostic command of the error solution process; and
    updating the stored diagnostic model based on a result of error solution process,
    wherein the plurality of keywords include various types of keywords based on various types of queries for requesting solution to a same error, and
    wherein the start diagnostic command is different for the same error based on the extracted various types of keywords.

2. The method of claim 1, wherein the extracting of the plurality of keywords comprises extracting an error keyword and a diagnostic keyword from the consultation data using a language processing algorithm.

3. The method of claim 2, further comprising identifying, based on the plurality of keywords comprising the error keyword, a plurality of diagnostic commands related to the error keyword.

4. The method of claim 3, wherein the generating of the diagnostic model comprises mapping the extracted error keyword on the identified diagnostic commands based on the weights.

5. The method of claim 4, wherein the mapping uses at least one of a statistic algorithm or a machine learning algorithm.

6. The method of claim 1, wherein the correlations among the diagnostic commands are identified using at least one of a statistic algorithm or a machine learning algorithm.

7. An apparatus comprising:
    a memory; and
    a processor configured to:
        obtain consultation data from a dialogue for solving an error of an electronic device, based on occurrence of the error;
        extract a plurality of keywords from the consultation data, the plurality of keywords having an order based on an order of the extracting;
        based on the plurality of keywords, generating a diagnostic model comprising a plurality of diagnostic commands for solving the error and a diagnostic sequence of diagnostic commands based on uni-directional and bi-directional connections between diagnostic commands determined in accordance with weights allocated based on correlations among the diagnostic commands, wherein the diagnostic sequence is based on the order in which the plurality of keywords is extracted from the consultation data, diagnostic commands connected uni-directionally in the diagnostic model are performable in a sequence in which one of two uni-directionally-connected commands always follows the other of the two uni-directionally-connected commands, and diagnostic commands connected bi-directionally in the diagnostic model are performable in a sequence in which either one of two bi-directionally connected commands follows the other of the two bi-directionally-connected commands;
        store, in the memory, the diagnostic model;
        obtain a query requesting a solution to the error;
        identify an error solution process for the error using the stored diagnostic model, the error solution process comprising error solution diagnostic keywords, from the plurality of the diagnostic commands, including a start diagnostic command corresponding to a keyword extracted from the obtained query and a diagnostic sequence for performing the error process diagnostic commands based on the start diagnostic command and directions of the uni-directional and bi-directional connections among diagnostic commands connected to the start diagnostic command in the stored diagnostic model, wherein the processor determines a diagnostic command having highest weight as the start diagnostic command of the an error solution process for the error; and update the stored diagnostic model using the at least one error solution process or error solution result,
wherein the plurality of keywords include various types of keywords based on various types of queries for requesting solution to a same error, and
wherein the start diagnostic command is different for the same error based on the extracted various types of keywords.

8. The apparatus of claim 7, wherein, based on the plurality of keywords comprising an error keyword, the processor is configured to identify a plurality of diagnostic commands related to the error keyword.

9. The apparatus of claim 8, wherein the processor is configured to generate the diagnostic model by mapping the extracted error keyword on the acquired diagnostic commands based on the weights.

10. The apparatus of claim 7, wherein the weights are allocated to the diagnostic commands so that a diagnostic command having a first diagnostic order is allocated a higher weight than a diagnostic command having a second diagnostic order slower than the first diagnostic order.

11. The apparatus of claim 7, wherein the weights are allocated to the diagnostic commands so that a diagnostic command corresponding to a diagnostic keyword having a having a first generation frequency is allocated a higher weight than a diagnostic command corresponding to a diagnostic keyword having a second generation frequency lower than the first generation frequency.

12. The method of claim 1, wherein the weights are allocated to the diagnostic commands so that a diagnostic command having a first diagnostic order is allocated a higher weight than a diagnostic command having a second diagnostic order slower than the first diagnostic order.

13. The method of claim 1, wherein the weights are allocated to the diagnostic commands so that a diagnostic command corresponding to a diagnostic keyword having a having a first generation frequency is allocated a higher weight than a diagnostic command corresponding to a diagnostic keyword having a second generation frequency lower than the first generation frequency.

* * * * *